US012594631B2

(12) United States Patent
Kobayashi et al.

(10) Patent No.: US 12,594,631 B2
(45) Date of Patent: Apr. 7, 2026

(54) LASER MACHINING METHOD

(71) Applicant: HONDA MOTOR CO., LTD., Tokyo (JP)

(72) Inventors: Takashi Kobayashi, Tochigi (JP); Naruhiko Okubo, Tochigi (JP); Kenichi Fukami, Tochigi (JP); Seiichi Kouketsu, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 780 days.

(21) Appl. No.: 17/915,277

(22) PCT Filed: Mar. 30, 2021

(86) PCT No.: PCT/JP2021/013552
§ 371 (c)(1),
(2) Date: Sep. 28, 2022

(87) PCT Pub. No.: WO2021/200953
PCT Pub. Date: Oct. 7, 2021

(65) Prior Publication Data
US 2023/0249292 A1     Aug. 10, 2023

(30) Foreign Application Priority Data

Mar. 31, 2020     (JP) ................................. 2020-064223

(51) Int. Cl.
*B23K 26/382* (2014.01)
*B23K 26/70* (2014.01)
(52) U.S. Cl.
CPC ............ *B23K 26/382* (2015.10); *B23K 26/70* (2015.10)
(58) Field of Classification Search
CPC ..... B23K 26/382; B23K 26/384; B23K 26/70
(Continued)

(56) References Cited

U.S. PATENT DOCUMENTS 6,495,796 B2    12/2002  Fukaya et al.
8,628,715 B2    1/2014   Kakui et al.
(Continued)

FOREIGN PATENT DOCUMENTS

JP        2000-225486 A      8/2000
JP        2002-35973 A       2/2002
(Continued)

OTHER PUBLICATIONS

International Search Report dated Jun. 22, 2021, Application No. PCT/JP2021/013552; English translation included, 4 pages.
(Continued)

*Primary Examiner* — Elizabeth M Kerr
*Assistant Examiner* — Alba T Rosario-Aponte
(74) *Attorney, Agent, or Firm* — Rankin, Hill & Clark LLP

(57) ABSTRACT

Provided is a laser machining method with which strain occurring in a workpiece can be reduced even when a large number of through-holes are formed. The laser machining method includes: a gas supply step (S3) of making a gas pressure on the back surface side of a workpiece 1 higher than a gas pressure on the front surface side of the workpiece 1; a deep hole machining step (S5) of irradiating the workpiece 1 from the front surface side with a pulsed laser having a first repetition frequency f1, thereby forming through-holes A in the workpiece 1; and a hole finishing step (S7) of irradiating the inner surface of the through-holes A with a pulsed laser having a second repetition frequency f2 that is lower than the first repetition frequency f1.

1 Claim, 5 Drawing Sheets

(58) Field of Classification Search
    USPC .......................................... 219/121.71, 121.7
    See application file for complete search history.

(56)                    References Cited

U.S. PATENT DOCUMENTS

2002/0170891 A1 *  11/2002  Boyle ................... B23K 26/123
                                                          216/13
2013/0020294 A1 *   1/2013  Elfizy .................. B23K 26/389
                                                          219/121.71
2014/0245608 A1      9/2014  Morimoto et al.

FOREIGN PATENT DOCUMENTS

JP        2005-177786  A       7/2005
JP        2008-55477   A       3/2008
JP        2008055477   A   *   3/2008
JP        2009-209431  A       9/2009
JP        2010188361   A   *   9/2010
JP        2011-143434  A       7/2011
JP        2011224600   A   *  11/2011
JP        2013-144312  A       7/2013
JP        2014-121734  A       7/2014

OTHER PUBLICATIONS

International Preliminary Report on Patentability dated Jul. 12,
2022, Application No. PCT/JP2021/013552, 15 pages.
Indian First Examination Report dated Nov. 16, 2022 issued in
corresponding Indian patent application No. 202247060970; Eng-
lish translation included (5 pages).

* cited by examiner

LASER MACHINING METHOD

TECHNICAL FIELD

The present invention relates to a laser machining method.

BACKGROUND ART

When a workpiece is irradiated with laser pulses to form a through-hole therein, a peak output, a pulse width, a repetition frequency, the number of shots, and the like of laser light are appropriately set according to the depth of the hole and the like. At the time of machining, gas is supplied from a laser light irradiation side to prevent fumes from jumping into a laser machining head. In addition, a molten metal is discharged from the through-hole to prevent dross (molten material) from adhering to the inner surface of the hole.

However, particularly when a large number of through-holes are formed in proximity by laser machining, recasting (remelting) may occur due to heat input by laser light, and strain may occur due to solidification of the molten metal. This strain may cause cracks in the workpiece. It is conceivable to perform laser machining while suppressing heat input, but there is a disadvantage in that the machining time becomes significantly long.

Therefore, Patent Literature 1 discloses supply of gas also from a laser light emission side of the workpiece, so that a gas pressure on the emission side is made higher than that on an incident side. As a result, a gas flow from the emission side toward the incident side is formed, which discharges the dross generated during machining to the incident side.

In addition, Patent Literature 2 discloses pilot hole machining performed by irradiation with a nanosecond laser, followed by finish machining performed by irradiation with a picosecond laser. As a result, a temperature rise at the time of finishing is suppressed, which improves the accuracy.

CITATION LIST

Patent Literature

Patent Literature 1: JP 2002-35973 A
Patent Literature 2: JP 2008-55477 A

SUMMARY OF INVENTION

Technical Problem

However, known techniques described in Patent Literature 1, 2, and the like have a problem in that strain increases when a large number of through-holes are formed, particularly when through-holes having a high aspect ratio are formed close to each other. This problem particularly occurs when the workpiece is annular.

In view of the above points, an object of the present invention is to provide a laser machining method capable of reducing strain occurring in a workpiece even when a large number of through-holes are formed.

Solution to Problem

A laser machining method of the present invention includes: a step of setting a gas pressure on a back surface side of a workpiece to be higher than a gas pressure on a front surface side of the workpiece; a step of forming through-holes in the workpiece by irradiating the workpiece with a pulsed laser having a first repetition frequency from the front surface side of the workpiece; and a step of irradiating an inner surface of the through-holes with a pulsed laser having a second repetition frequency lower than the first repetition frequency.

With the laser machining method of the present invention, the inner surface of the through-holes is irradiated with the pulsed laser having the second repetition frequency lower than the first repetition frequency of the pulsed laser with which the workpiece is irradiated in the step of forming the through-holes. As a result, it is possible to balance exhaust heat by a gas flowing from a back side of the through-holes and input heat by the laser with which the workpiece is irradiated from a front side of the through-holes. Therefore, it is possible to perform a finishing step of the through-hole by irradiating the through-holes with the pulsed laser having the second repetition frequency while suppressing a heat storage inside the through-holes, which makes it possible to suppress the strain generated in the workpiece.

In addition, since the heat storage to the workpiece can be suppressed, the number of shots in the finishing step can be increased, which reduces recasting. In addition, a reduction in recasting makes it possible to reduce strain of the workpiece and occurrence of cracks due to re-solidification of recasting. Moreover, since the residual strain generated in the workpiece can be reduced, the correction process after machining can be reduced.

In the laser machining method of the present invention, it is preferable to, in the step of irradiating the workpiece with the pulsed laser having the second repetition frequency, continue a state in which the gas pressure on the back surface side of the workpiece is higher than the gas pressure on the front surface side.

In this case, in the step of irradiating the workpiece with the pulsed laser having the second repetition frequency, the gas continuously flows from the back surface side toward the front surface side of the workpiece. This makes it possible to further reduce the occurrence of strain and cracks of the workpiece.

DESCRIPTION OF EMBODIMENTS

Figure 1:
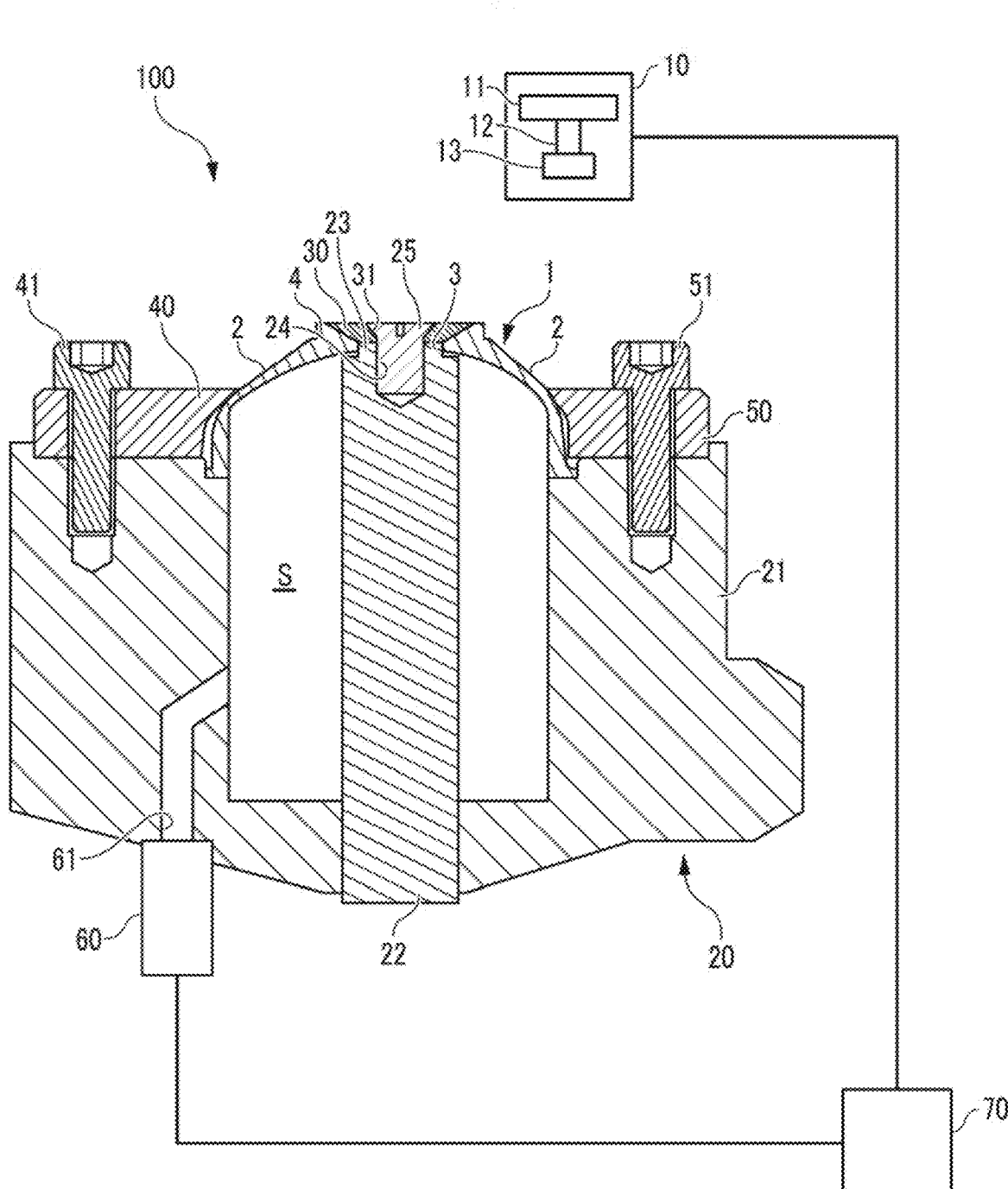
FIG. 1 is a cross-sectional view schematically illustrating an example of a laser machining device used in a laser machining method according to an embodiment of the present invention.
Figure 2:
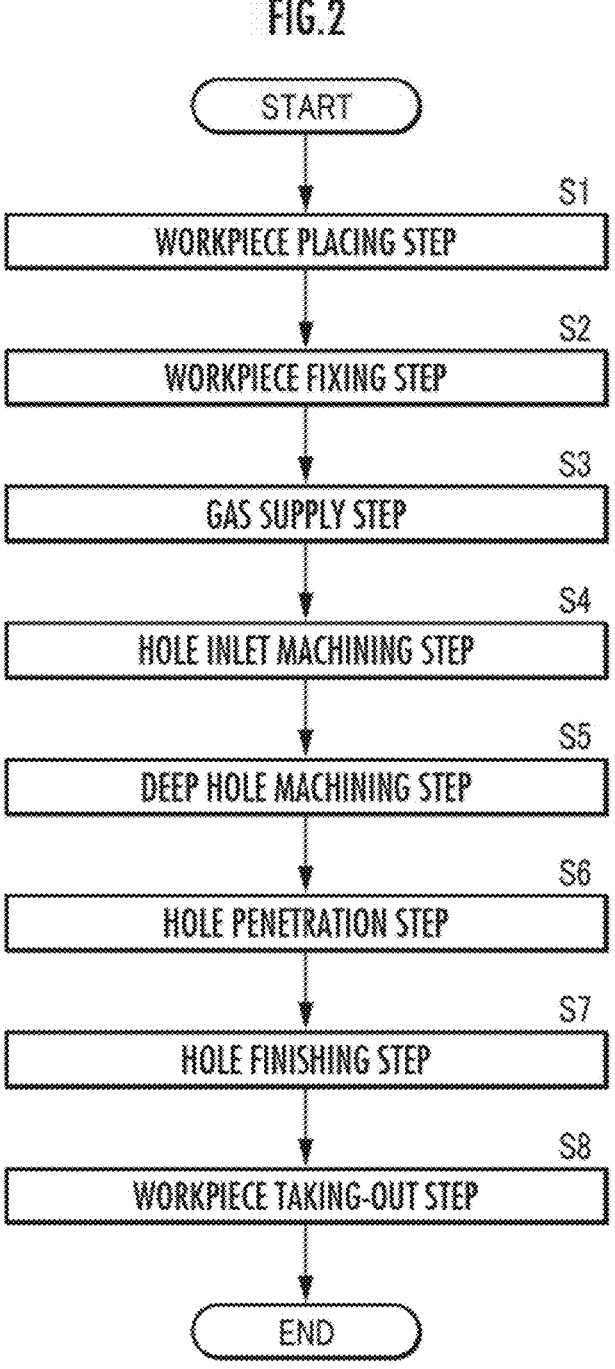
FIG. 2 is a flowchart illustrating a laser machining method according to an embodiment of the present invention.

Hereinafter, an example of a laser machining device 100 used when performing a laser machining method according to an embodiment of the present invention will be described with reference to FIG. 1. The laser machining device 100 forms a large number of through-holes A in a substantially half-donut-shaped workpiece (material to be machined) 1 by laser machining.

The workpiece has a wall portion 2 as a whole that is a substantially semicircular arched longitudinal cross section protruding upward in a substantially annular shape in a top view. Furthermore, in the workpiece 1, a purality of (here, eight) port holes 3 having the same diameter and penetrating therethrough are formed at equal intervals on the same circle in a top view of the wall portion 2. However, in order to perform phase determination, one specific port hole 3 may have a diameter or a tolerance of a diameter different from those of the other port holes 3. The workpiece 1 is made of, for example, an alloy having excellent heat resistance and corrosion resistance, such as a nickel alloy to which molyb-denum, chromium, or the like is added.

Then, using the laser machining device 100, a large number of fine through-holes A inclined at the same angle in a clockwise direction from above are formed over substan-tially the entire surface of substantially the upper half of the wall portion 2 of the workpiece 1. As described above, since the through-holes A have a small hole diameter and are oblique, the through-holes A have a large aspect ratio and are formed close to each other. The hole diameter and the inclination angle of the through-holes A may be the same or different.

The laser machining device 100 includes a laser machin-ing head 10, a workpiece support 20, clamps 30, 40, and 50, a gas supply means 60, and a control unit 70.

The machining head 10 includes, for example, a laser source 11 capable of generating a laser pulse such as a YAG laser, a semiconductor laser, or a fiber laser; and a laser light irradiation unit 13 connected to the laser source 11 through a transmission fiber 12 and having an optical system such as a mirror or a lens. The laser light generated by the laser source 11 is guided to the laser light irradiation unit 13 through the transmission fiber 12 under the conditions set by the control unit 70. The laser light irradiation unit 13 condenses the laser light transmitted through the transmis-sion fiber 12 at a position set by the control unit 70.

The workpiece support 20 supports the workpiece 1 from the lower surface (back surface) side. The lower surface side is a laser emission side. When the workpiece support 20 supports the workpiece 1 before the through-holes A are machined, a sealed space S is formed between the lower surface of the workpiece 1 and the workpiece support 20. Here, the workpiece support 20 supports the workpiece 1 by placing the workpiece 1 at three positions: a peripheral edge of a portion where the port hole 3 of the workpiece 1 is formed; a lower surface of the wall portion 2 on the inner peripheral side; and a lower surface of the wall portion on the outer peripheral side.

Specifically, the workpiece support 20 includes a cylin-drical pin 22 fixed to a support main body 21 constituting a main body of the workpiece support 20. A cylindrical protrusion 23 having a smaller diameter than the pin 22 is integrally provided at the top of the pin 22. Then, in a state where the protrusion 23 is positioned in the port hole 3, the workpiece 1 is supported in a state where the lower surface of the outer peripheral portion of the port hole 3 of the workpiece 1 is placed on the upper surface of the pin 22.

Furthermore, a bolt hole 24 is formed at the top of the protrusion 23, and a port clamp 30 is fixed to the upper surface of the protrusion 23 by a bolt 25 screwed into the bolt hole 24. As a result, the workpiece 1 is fixed at a predetermined position of the workpiece support 20.

Further, an inner clamp 40 is fixed to an inner upper surface of the workpiece 1 supported by the workpiece support 20 using a bolt 41 so as to abut on the wall portion 2 on the inner peripheral side or the workpiece 1 from above. Further, an outer clamp 50 is fixed to an outer upper surface of the workpiece 1 supported by the workpiece support 20 using a bolt 51 so as to abut on the wall portion 2 on the outer peripheral side of the workpiece 1 from above.

The gas supply means 60 supplies a gas such as air, argon, or nitrogen into the sealed space S via a gas supply path 61 formed in the support main body 21, thereby making the gas pressure in the sealed space S higher than the gas pressure in the space located outside the sealed space S, particularly on the front surface side of the workpiece 1. Specifically, the gas is supplied into the sealed space S by the gas supply means 60 so as to generate a difference in gas pressure of 0.1 MPa or more, more preferably 0.5 MPa or more with respect to the external gas pressure. Although not illustrated, it is preferable to supply gas also to the front surface side of the workpiece 1.

The control unit 70 is connected to the laser machining head 10 and the gas supply means 60, and controls each operation. Note that the control unit 70 may be provided separately so as to control each of the laser machining head 10 and the gas supply means 60, or may be provided integrally so as to control the entire device.

Hereinafter, a laser machining method according to an embodiment of the present invention using the laser machin-ing device 100 described above will be described.

First, a workpiece placing step (S1) of placing the work-piece 1 at a predetermined position of the workpiece support 20 is performed. Specifically, the clamps 30, 40, and 50 are previously positioned in a state of being removed from the workpiece support 20. Then, a worker places the workpiece 1 at a predetermined position of the workpiece support 20 such that each port hole 3 of the workpiece 1 is located in the protrusion 23.

Then, a workpiece fixing step (S2) of fixing the workpiece 1 placed at a predetermined position of the workpiece support 20 with the clamps 30, 40, and 50 is performed. Specifically, the worker fixes the workpiece 1 to the work-piece support 20 with each port clamp 30. Furthermore, the workpiece 1 is also fixed to the workpiece support 20 with the inner clamp 40 and the outer clamp 50.

Next, a gas supply step (S3) of supplying gas into the sealed space S by the gas supply means 60 so that the sealed space S has a predetermined gas pressure is performed.

After the gas pressure inside the sealed space S reaches a predetermined pressure or higher, a hole inlet machining step (S4) of forming the vicinity of the inlet portions of the through-holes A in the workpiece 1 is performed with the laser machining head 10. Thereafter, a deep hole machining step (S5) of making the depth of the through-hole A deep is performed. In these steps, the laser machining head 10 irradiates the workpiece with a pulsed laser having a first repetition frequency f1. The first repetition frequency f1 may be the same frequency as a known frequency that is con-sidered to be suitable for forming the through-holes A, and is, for example, 50 Hz to 100 Hz. In addition, setting conditions such as a peak output, a pulse width, and the number of shots of the pulsed laser with which the work-piece is irradiated in the hole inlet machining step (S4) and the deep hole machining step (S5) may be the same as those in known methods.

Next, a hole penetration stop (S6) of penetrating the through-holes A is performed. Thereafter, a hole finishing step (S7) of irradiating the inner surface of the penetrated through-holes A with the laser pulse is performed. The hole finishing step (S7) is performed every time one through-hole A is made to penetrate.

In the hole penetration step (S6) and the hole finishing step (S7), the workpiece is irradiated with the pulsed laser having the second repetition frequency f2. It is preferable that the hole inlet machining step (S4), the deep hole machining step (S5), the penetration step (S6), and the hole finishing step (S7) are continuously performed. In particular, it is preferable to perform the hole penetration step (S6) with the repetition frequency changed from the first repetition frequency f1 to a second repetition frequency f2, immediately after the deep hole machining stop (S5).

The second repetition frequency f2 is lower than the first repetition frequency f1, and is, for example, less than or equal to ⅔ or less than or equal to half of the first repetition frequency f1, or less than or equal to 40 Hz, or less than or equal to 30 Hz. Setting conditions such as a peak output and a pulse width of the pulsed laser with which the workpiece is irradiated in the hole penetration step (S6) and the hole finishing step (S7) may be the same as those in the deep hole machining step (S5). In addition, the number of shots in the hole penetration step (S6) and the hole finishing stop (S7) may be appropriately set according to the hole diameter, depth, and the like of the through-hole A, and is, for example, 10 shots or more and 200 shots or less.

Also, setting conditions such as the first repetition frequency f1, the peak output, and the pulse width of the pulsed laser with which the workpiece is irradiated in the hole inlet machining step (S4) and the deep hole machining step (S5) may be the same or different. Moreover, setting conditions such as the second repetition frequency f2, the peak output, and the pulse width of the pulsed laser with which the workpiece is irradiated in the hole penetration step (S6) and the hole finishing step (S7) may be the same or different.

Note that when the through-holes A are formed, the gas leaks out from the through-hole A, and therefore after the hole penetration step (S6), it is preferable to supply the gas continuously or intermittently by the gas supply means 60.

After all the fine through-holes A are formed as described above, the worker releases the clamps 30, 40, and 50 to perform a workpiece taking-out step (S8) of taking out the workpiece 1. Thus, all the steps are completed.

As described above, according to the present embodiment, the second repetition frequency f2 of the pulsed laser with which the workpiece is irradiated in the hole penetration step (S6) and the hole finishing step (S7) is lower than the first repetition frequency f1 of the pulsed laser with which the workpiece is irradiated in the hole inlet machining step (S4) and the deep hole machining step (S5). As a result, it is possible to balance exhaust heat by a gas flowing from a back side of the through-holes A and input heat by the laser with which the workpiece is irradiated from a front side of through-holes A. Therefore, it is possible to perform the hole finishing step (S7) of irradiating the workpiece with the pulsed laser having the second repetition frequency f2 while suppressing a heat storage inside the through-holes A, which makes it possible to suppress the strain generated in the workpiece 1.

In addition, since the heat storage to the workpiece 1 can be suppressed, the number of shots in the hole finishing step (S7) can be increased, which reduces recasting. Also, a reduction in recasting makes it possible to reduce strain of the workpiece 1 and occurrence of cracks due to re-solidification of recasting. Moreover, since the residual strain generated in the workpiece 1 can be reduced, the correction process after machining can be reduced.

Figure 3:
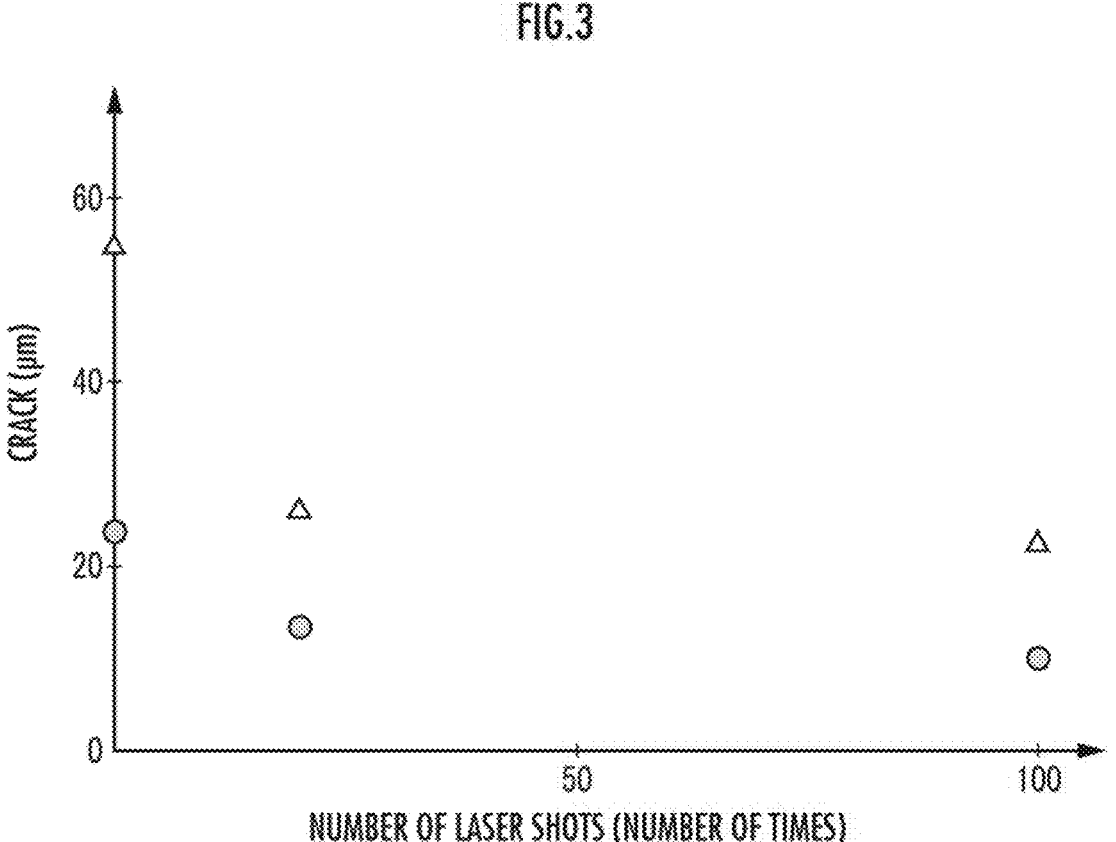
FIG. 3 is a graph illustrating a relationship between the number of laser shots and a crack.

The inventors measured the depth of the crack generated by the difference in the number of laser shots at the second repetition frequency f2 of the pulsed laser with which the workpiece is irradiated in the hole finishing step (S7) using a test piece. The measurement results are plotted in FIG. 3. In FIG. 3, circles indicate the average depth of the crack, and triangles indicate the maximum depth of the crack. The number of shots at the first repetition frequency f1 was about 100, and setting conditions other than the number of laser shots of the pulsed laser in the hole finishing step (S7) were all the same.

As can be seen from FIG. 3, as compared with the case where the number of laser shots is zero, that is, the hole finishing step (S7) is not performed, the crack is suppressed by irradiating the workpiece with the pulsed laser having the second repetition frequency f2 in the hole finishing step (S7). This is considered to be because recasting is reduced. In addition, as compared with the case where the number of laser shots is 20, when the number of laser shots is 100, the crack is further suppressed, but the difference is not so large.

Figure 4:
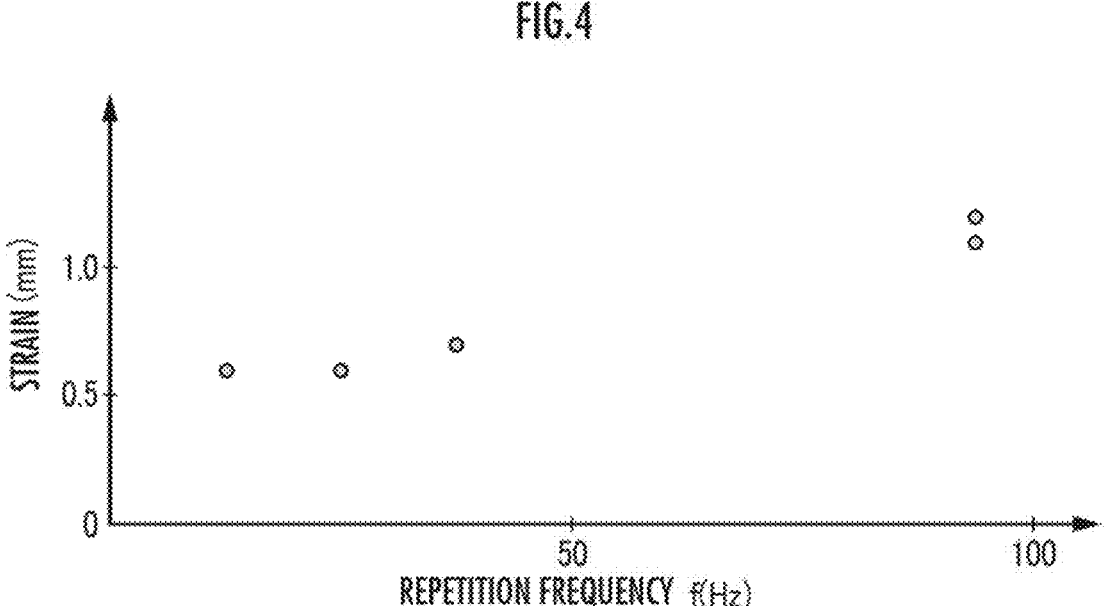
FIG. 4 is a graph illustrating a relationship between a second repetition frequency and strain of a workpiece.

The inventors measured the strain caused by the difference in the second repetition frequency f2 of the pulsed laser with which the workpiece is irradiated in the hole penetration step (S6) and the hole finishing step (S7) using a test piece. Referring to FIG. 4 illustrating the measurement results, when the second repetition frequency f2 was as small as 10 Hz, 20 Hz, and 30 Hz, the strain amount was suppressed to be small. On the other hand, when the second repetition frequency f2 was 75 Hz, which was the same as the first repetition frequency f1, the strain amount was large. Note that the setting conditions other than the frequency of the repetition frequency f2 of the pulsed laser in the hole penetration step (S6) and the hole finishing step (S7) were all the same.

Figure 5:
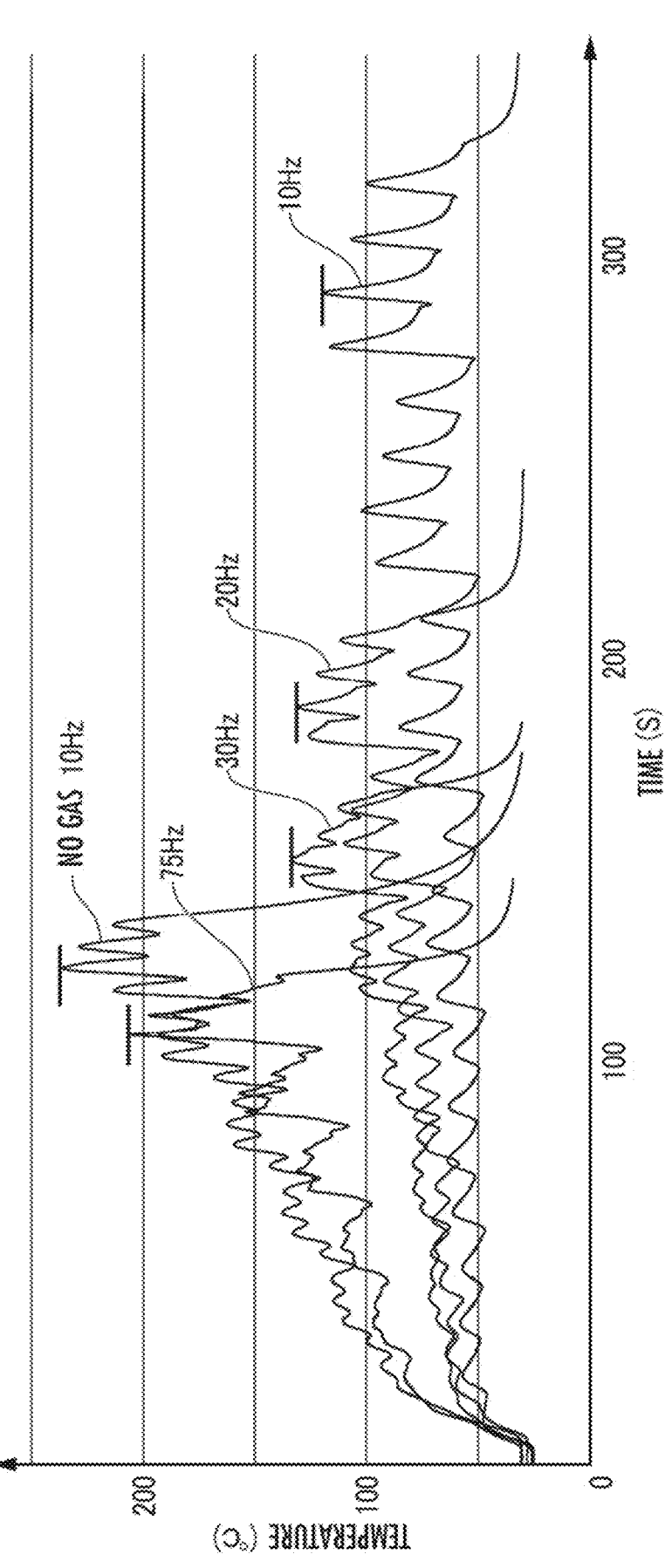
FIG. 5 is a graph illustrating a temperature change of a test piece due to a difference in the second repetition frequency.

Furthermore, the inventors measured a temperature change in the test piece caused by the difference in the second repetition frequency f2 of the pulsed laser with which the workpiece is irradiated in the hole finishing step (S7) using a test piece. The measurement results are plotted in FIG. 5. In FIG. 5, the horizontal line indicates the highest attainment temperature at each second repetition frequency f2.

It can be seen from FIG. 5 that when the second repetition frequency f2 is 10 Hz, 20 Hz, or 30 Hz, the heat storage in the test piece does not increase so much, and the attainment temperature does not increase so much. It can be considered from this that when the second repetition frequency f2 is 30 Hz or less, the temperature of the workpiece 1 does not become so high and recasting is suppressed even if the hole finishing step (S7) is performed for a long time with the number of shots increased.

On the other hand, when the second repetition frequency f2 is 75 Hz, the heat storage in the test piece increases with time, and the attainment temperature increases. Therefore, it is considered that when the number of shots increases and the hole finishing step (S7) is performed for a long time, the temperature of the workpiece 1 becomes high and recasting increases. Thus, it is preferable to suppress the number of shots.

In addition, in the hole finishing step (S7), when the second repetition frequency f2 is 10 Hz but the gas supply step (S3) of supplying the gas into the sealed space S by the gas supply means 60 is omitted, the heat storage in the test piece increases with time, and the attainment temperature becomes very high. Therefore, the temperature of the workpiece 1 becomes high, recasting increases, and cracks increase, which is not preferable.

Although embodiments of the present invention have been described above, the present invention is not limited thereto, and the configurations and forms of the workpiece 1 and the laser machining device 100 used in the present invention can be appropriately changed. Furthermore, although the case where the through-holes A are formed obliquely has been described, the through-holes A may be formed vertically.

In addition, the case where the workpiece is irradiated with the pulsed laser having the second repetition frequency f2 in the hole penetration step (S6) has been described. However, the present invention is not limited thereto, and in the hole penetration step (S6), the workpiece may be irradiated with the same pulsed laser as that used in the deep hole machining step (S5), that is, the workpiece may be irradiated with the pulsed laser having the first repetition frequency f1. In this case, the deep hole machining step (S5) and the hole penetration step (S6) are integrated.

REFERENCE SIGNS LIST

1 Workpiece
2 Wall portion
3 Port hole
10 Laser machining head
11 Laser source
12 Transmission fiber
13 Laser light irradiation unit
20 Workpiece support
21 Support main body
22 Pin
23 Protrusion
24 Bolt hole
25 Bolt
30 Port clamp
40 Inner clamp
41 Bolt
50 Outer clamp
51 Bolt
60 supply means
61 Gas supply path
70 Control unit
100 Laser machining device

The invention claimed is:

1. A laser machining method comprising:
a step of setting a gas pressure on a back surface side of a workpiece to be higher than a gas pressure on a front surface side of the workpiece;
a step of forming through-holes in the workpiece by irradiating the workpiece with a pulsed laser having a first repetition frequency from the front surface side of the workpiece; and
a finishing step of irradiating inner surfaces of the through-holes with a pulsed laser having a second repetition frequency lower than the first repetition frequency, wherein
the finishing step is repeated for each of the through-holes by changing only a repetition frequency and by irradiating the inner surface of each of the through-holes with the pulsed laser every time each of the through-holes is formed, to provide the through-holes close to each other,
in the finishing step of irradiating the inner surfaces of the through-holes with the pulsed laser having the second repetition frequency, a state in which the gas pressure on the back surface side of the workpiece is higher than the gas pressure on the front surface side is continued.

* * * * *